United States Patent [19]

Bennett

[11] 4,002,357
[45] Jan. 11, 1977

[54] ARTICULATED HOSE SUPPORT

[76] Inventor: David F. Bennett, 1100 Fleetwood Ave., Daytona Beach, Fla. 32014

[22] Filed: July 16, 1975

[21] Appl. No.: 596,258

[52] U.S. Cl. .............................. 285/61; 285/114; 285/282; 248/75; 141/388
[51] Int. Cl.² .......................................... F16L 3/00
[58] Field of Search ................. 285/61, 62, 63, 64, 285/114, 282; 141/388; 248/75

[56] References Cited

UNITED STATES PATENTS

| | | | |
|---|---|---|---|
| 1,387,508 | 8/1921 | Nescher | 285/63 |
| 1,573,202 | 2/1926 | Stenwick | 248/75 |
| 1,752,193 | 3/1930 | Hanlon | 285/114 |
| 2,030,218 | 2/1936 | Maxwell | 285/114 |
| 2,170,557 | 8/1939 | Guarnaschelli | 285/61 |
| 3,132,773 | 5/1964 | Hampton | 222/376 |
| 3,901,270 | 8/1975 | Smith | 285/114 |

Primary Examiner—Andrew V. Kundrat
Attorney, Agent, or Firm—John N. Randolph

[57] ABSTRACT

A mechanical support for a short flexible hose section including a rigid L-shaped bracket having an upright leg to an upper end of which is rigidly secured a short rigid conduit section, which is disposed crosswise of said leg and to an inner end of which is secured one end of a flexible hose. The other lower horizontal leg of said bracket, which extends under said flxible hose, terminates in a upright bearing sleeve which rotatively receives a pivot pin. One end of a rigid arm, constituting the other section of said mechanical support, has one end secured to the upper end of said pivot pin for swingably supporting the arm relative to said bracket. A second short conduit section is rigidly secured to the other upturned end of said arm. The other end of said flexible hose is secured to the inner end of said last mentioned rigid conduit section. One end of a conventional semi-rigid hose is connected to the other outer end of said second short conduit section and the opposite end of said semi-rigid hose is connected to the outer end of a corresponding short conduit section of a second identical mechanical support to provide a continuous conduit between the two rigid conduit sections which are supported by the brackets, so that one of said mechanical supports may travel back and forth relative to the other mechanical support without twisting or kinking the semi-rigid hose, due to the fact that the arms of the mechanical supports will swing back and forth relative to their supporting brackets to maintain the ends of the flexible hoses, supported by said arms, substantially in alignment with the adjacent ends of the semi-rigid hose.

7 Claims, 4 Drawing Figures

U.S. Patent    Jan. 11, 1977    4,002,357
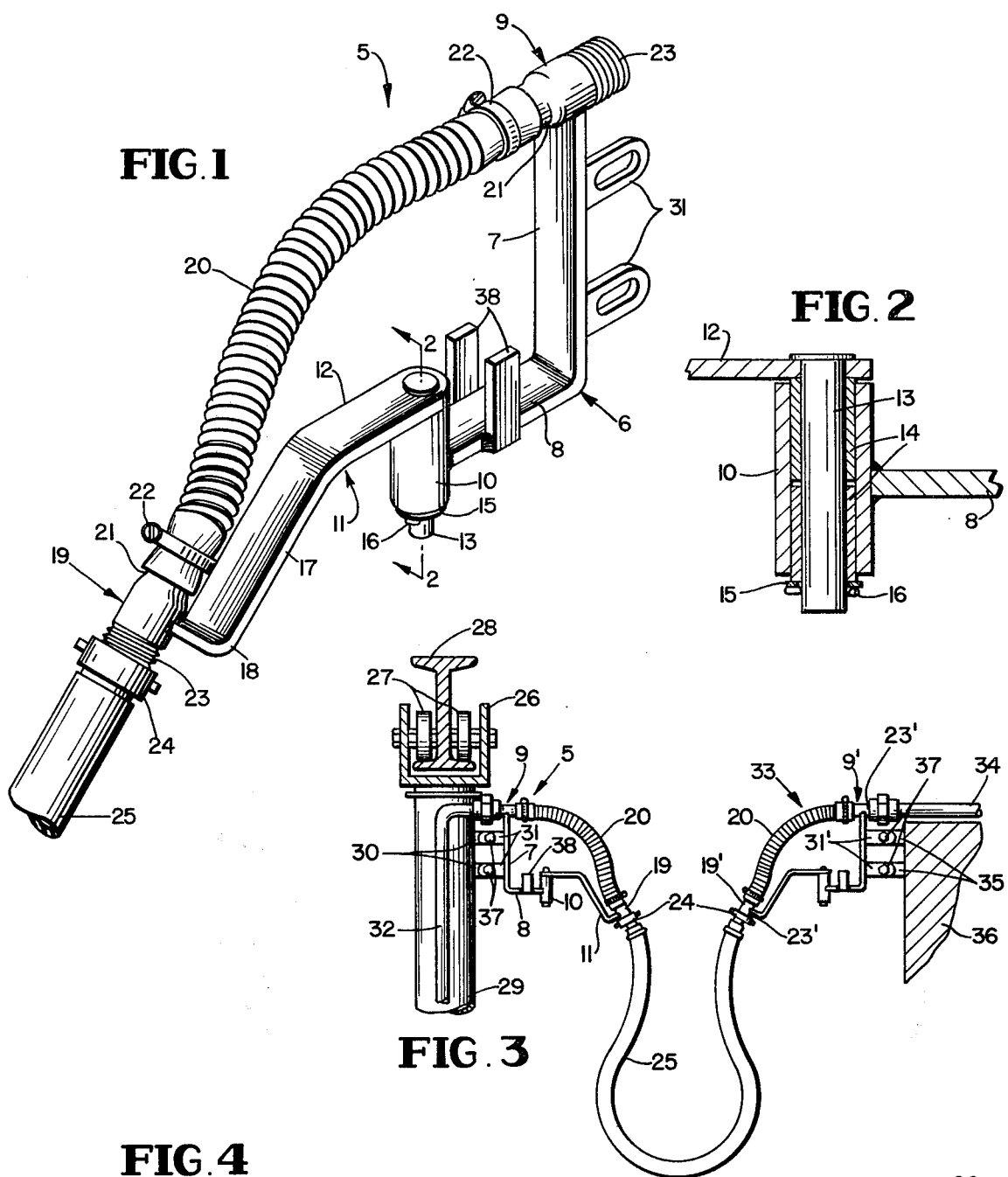
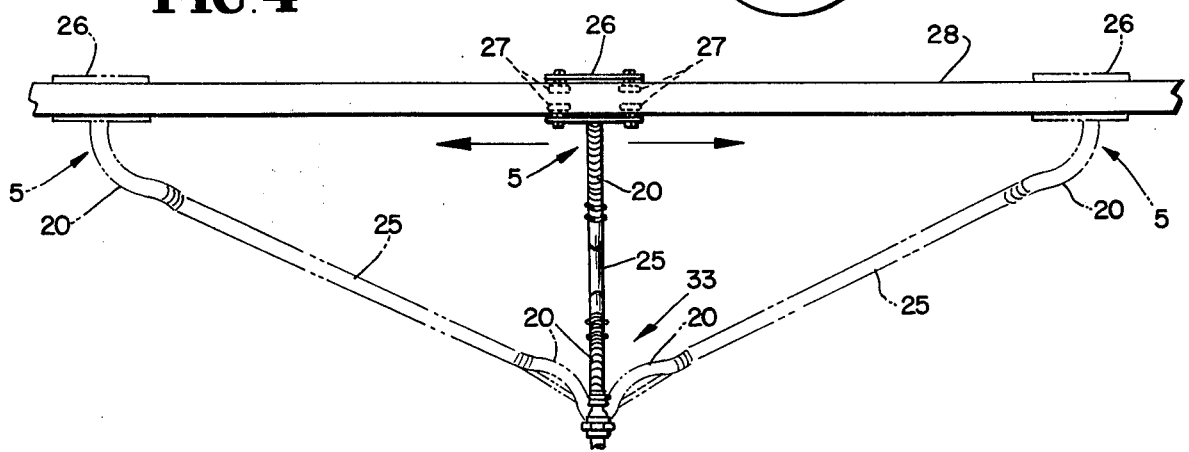

ARTICULATED HOSE SUPPORT

BACKGROUND OF THE INVENTION

Where a conventional semi-rigid hose having a diameter greater than one inch is utilized in a conduit system where one end of said hose has to move back and forth in substantially a horizontal plane relative to the other end thereof as, for example, in connection with the air supply conduit of a sludge removing apparatus of a settling tank, the hose tends to kink and twist resulting in a very short hose life. Various arrangements of swivel joints have been employed to provide connections between the ends of such hoses and a rigid conduit member to which each end is connected. Such swivel joints have proved complicated and costly and frequently develop leaks after short periods of use.

SUMMARY

Accordingly, it is a primary object of the present invention to provide an inexpensive mechanical support by means of which an end of a conventional semi-rigid hose can be connected to a rigid conduit by interposing a short very flexible hose between said conduit and said end of the semi-rigid hose, and attaching the ends of said flexible conduit to the ends of an articulated support, whereby the end of the flexible hose which is connected to the semi-rigid hose is supported to swing back and forth relative to the other end of said flexible hose to always retain a position substantially in alignment with said end of the semi-rigid hose when a reciprocating motion is imparted to said articulated support.

Another object of the invention is to provide such an articulated support which, in combination with the short piece of flexible hose supported thereby, provides a mechanical pivot joint capable of functioning like a swivel, but which does not include mechanical parts in which leakage could develop.

A further object of the present invention is to provide a conduit composed of a semi-rigid intermediate section and flexible end sections and wherein each end section is mounted on an articulated support so that one such support may travel back and forth relative to the other support without subjecting the semi-rigid intermediate section of said conduit to bending or twisting forces which could cause kinking.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a perspective view of the articulated hose support, shown connected to an end of a semi-rigid hose;

FIG. 2 is an enlarged sectional view taken substantially along a plane as indicated by the line 2—2 of FIG. 1;

FIG. 3 is a side elevational view, partly in cross section, showing two of the articulated hose supports connected to the semi-rigid hose and combining therewith to form a part of a conduit system, and FIG. 4 is a top plan view of the structure as seen in FIG. 3.

DESCRIPTION OF THE PREFERRED EMBODIMENT

Referring more specifically to the drawing, the articulated hose support in its entirety is designated generally 5 and includes a rigid-L-shaped bracket 6 having an upright leg 7 and a substantially horizontal lower leg 8. A rigid conduit section 9 is rigidly secured to the upper end of the leg 7 with its axis disposed substantially crosswise of the plane of the leg 7. A bearing sleeve 10 is secured to the distal end of the leg 8 and is disposed perpendicular thereto and substantially parallel to the leg 7.

An arm 11 has an inner end 12 to which is secured the upper end of a pivot pin 13, which extends downwardly therefrom through the sleeve 10. The sleeve 10 contains bushings 14 in which the pin 13 is rotatively received. A washer 15 is supported on the pin 13 beneath the lower bushing 14 by cotter pin 16 which extends through said pin. The washer 15, while applied to the pin 13, retains said pin in the sleeve 10. The arm 11 has a downwardly inclined outer portion 17 provided with an upturned terminal 18 to which is secured a second rigid conduit section 19 which is disposed with its axis substantially crosswise of the plane of the terminal 18.

A short section of very flexible hose 20 extends between the conduit sections 9 and 19 and has its ends disposed over and secured to the adjacent ends 21 of said conduit sections by conventional clamps 22. Said conduit sections 9 and 19 have externally threaded remote ends 23. As seen in FIG. 1, a swivel nut 24 connects one end of a semi-rigid hose 25 to the threaded end 23 of the conduit section 19.

In FIGS. 3 and 4, the articulated hose support 5 is shown mounted on a carriage 26 having wheels 27 which ride on the bottom flange of an I-shaped rail 28. A support 29, such as a pipe, extends down from the carriage 26 and has apertured lugs 30 extending therefrom and secured by fastenings 37 to apertured lugs 31 which project from the leg 7 in a direction away from the leg 8. A pipe or hose 32 is connected to and leads from the end 23 of the conduit section 9.

A second articulated hose support 33, which corresponds with the hose support 5, is interposed between the other end of the hose 25 and a conduit 34. Brackets 35 extend from a support 36 and are connected by additional fastenings 37 to the lugs 31' of the support 33. A second swivel nut 24 connects the other end of the hose 25 to the end 23' of the conduit section 19' of the articulated support 33. The end 23' of the conduit section 9' of the articulated support 33 is connected to an end of a conduit 34, so that the hose 25, hoses 20 and conduit sections 9 and 19 form parts of the conduit 32,34.

The conduit 32 may be connected to an airlift pump of a sludge removing apparatus of which the pipe 29 forms a part, such as disclosed by U.S. Pat. No. 3,132,773, which issued May 12, 1964 to Quentin L. Hampton. The rail 28 is disposed parallel to the plane of reciprocating movement of such airlift pump, not shown, so that the articulated support 5 may travel back and forth along the rail 28 with the airlift pump without twisting or kinking the semi-rigid hose 25. As seen in FIG. 4, as the carriage 26 moves toward either extremity of its travel, as illustrated in dotted lines, the hoses 20 will flex and the arms 11 will swing about their pivots to maintain positions substantially in alignment with one another and so that the ends of the hoses 20, which are connected to the conduit sections 19 and/-19', will retain positions substantially in alignment with the hose 25 to thereby avoid any twisting or kinking of the hose 25. The legs 8 may be provided with stops 38 to limit swinging movement of the arms 11.

Various modifications and changes are contemplated and may be restored to, without departing from the function or scope of the invention.

I claim as my invention:

1. An articulated hose support comprising a mechanical support including a rigid bracket having a first leg and a second leg disposed at an angle to said first leg, an arm forming a part of said mechanical support having an inner end pivotally connected to a distal end of said second leg for swinging movement about an axis disposed substantially parallel to said first leg, a first rigid conduit section secured intermediate its ends to the distal end of said first leg normal thereto, a second rigid conduit section secured intermediate its ends to the distal end of said arm normal thereto, said conduit sections having adjacently disposed inner ends and remotely disposed outer ends, and a flexible hose extending between and having its ends coupled to said inner ends of the conduit sections, and supported thereby for swinging movement with the arm across the pivotal connection of the arm second leg.

2. An articulated hose support as in claim 1, said arm having a downwardly inclined outer portion terminating in an upturned terminal constituting said distal end.

3. An articulated hose support as in claim 1, said pivot means comprising a bearing sleeve secure to the distal end of said second leg and having its axis disposed substantially parallel to the plane of said first leg, and a pivot pin rotatively mounted in said bearing sleeve and having its upper end secured to said inner end of the arm.

4. An articulated hose support as in claim 1, and apertured lugs secured to and projecting from said first leg, in a direction away from the second leg, and adapted to be secured to a support member on which said articulated hose support is mounted.

5. An articulated hose support as in claim 1, a semi-rigid hose having one end connected to the other end of said second conduit secion and an opposite end connected to the outer end of the second conduit section of a second articulated hose support.

6. An articulated hose support as in claim 5, the outer end of one of said first sections being adapted to be secured to a fluid supply conduit, and the outer end of said other first conduit section being adapted to be secured to an end of a discharge conduit which is mounted for reciprocating movement across said supply conduit.

7. An articulated hose support as in claim 1, and stop means for limiting swinging movement of said arm relative to the bracket.

* * * * *